United States Patent
Lee et al.

(10) Patent No.: US 9,986,533 B2
(45) Date of Patent: May 29, 2018

(54) APPARATUS AND METHOD FOR PROVIDING COMMUNICATION

(71) Applicant: Samsung Electronics Co., Ltd., Suwon-si, Gyeonggi-do (KR)

(72) Inventors: Jong-Won Lee, Suwon-si (KR); Sung-Chul Park, Seoul (KR); Chai-Man Lim, Seoul (KR); Hyun-Ju Hong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 14/602,594

(22) Filed: Jan. 22, 2015

(65) Prior Publication Data

US 2015/0215901 A1 Jul. 30, 2015

(30) Foreign Application Priority Data

Jan. 29, 2014 (KR) ........................ 10-2014-0011807

(51) Int. Cl.
| | |
|---|---|
| *H04B 7/00* | (2006.01) |
| *H04W 72/02* | (2009.01) |
| *H04W 52/30* | (2009.01) |
| *H04W 24/08* | (2009.01) |
| *H04W 4/00* | (2018.01) |
| *H04B 1/04* | (2006.01) |
| *H04B 1/18* | (2006.01) |
| *H04B 17/10* | (2015.01) |
| *H04B 17/318* | (2015.01) |
| *H01Q 1/24* | (2006.01) |

(52) U.S. Cl.
CPC .......... *H04W 72/02* (2013.01); *H04B 1/0458* (2013.01); *H04B 1/18* (2013.01); *H04B 17/102* (2015.01); *H04B 17/318* (2015.01); *H04W 4/008* (2013.01); *H04W 24/08* (2013.01); *H04W 52/30* (2013.01); *H01Q 1/242* (2013.01)

(58) Field of Classification Search
CPC .... H01Q 1/242; H04B 17/102; H04B 17/318; H04B 1/0458; H04B 1/18; H04W 24/08; H04W 4/008; H04W 52/30; H04W 72/02
USPC .............................................. 455/41.1, 41.2
See application file for complete search history.

(56) References Cited

U.S. PATENT DOCUMENTS

| | | | |
|---|---|---|---|
| 6,741,640 B1 | 5/2004 | Johnson | |
| 7,285,977 B2 | 10/2007 | Kim | |
| 7,577,411 B2 | 8/2009 | Chang et al. | |
| 7,733,120 B2 | 6/2010 | Kato et al. | |
| 8,040,150 B2 | 10/2011 | Nakatsu | |
| 8,143,912 B2 | 3/2012 | Hsiao et al. | |

(Continued)

FOREIGN PATENT DOCUMENTS

| | | |
|---|---|---|
| CN | 1744602 A | 3/2006 |
| CN | 101213758 A | 7/2008 |

(Continued)

*Primary Examiner* — Xin Jia
(74) *Attorney, Agent, or Firm* — Jefferson IP Law, LLP

(57) ABSTRACT

A method for communication in an electronic device is provided. The method includes determining whether to control a communication module of the electronic device based on information related to communication between the electronic device and an external device, determining a control value for the communication module based on the determination, and controlling the communication module using the control value.

20 Claims, 6 Drawing Sheets

(56) References Cited

U.S. PATENT DOCUMENTS

| | | | |
|---|---|---|---|
| 2005/0265298 A1* | 12/2005 | Adachi | H04W 72/1289 370/338 |
| 2005/0277399 A1* | 12/2005 | Kronberger | H04B 1/0458 455/280 |
| 2009/0046030 A1 | 2/2009 | Song et al. | |
| 2009/0124229 A1 | 5/2009 | Fitzpatrick | |
| 2009/0147834 A1 | 6/2009 | Kishigami et al. | |
| 2009/0174496 A1* | 7/2009 | Van Bezooijen | H03F 1/56 333/17.3 |
| 2009/0253385 A1* | 10/2009 | Dent | H04B 1/0458 455/83 |
| 2010/0323650 A1 | 12/2010 | Egawa et al. | |
| 2012/0009983 A1 | 1/2012 | Mow et al. | |
| 2012/0286892 A1 | 11/2012 | Gu et al. | |
| 2013/0005278 A1* | 1/2013 | Black | H01Q 5/335 455/77 |
| 2013/0203364 A1 | 8/2013 | Darnell et al. | |
| 2013/0225098 A1* | 8/2013 | Ikehata | H03H 7/40 455/77 |
| 2013/0234901 A1 | 9/2013 | Chang et al. | |
| 2014/0200001 A1* | 7/2014 | Song | H04W 36/0094 455/436 |
| 2015/0044977 A1* | 2/2015 | Ramasamy | H04B 7/0404 455/77 |
| 2015/0072721 A1* | 3/2015 | Lagnado | H04W 52/28 455/522 |

FOREIGN PATENT DOCUMENTS

| | | |
|---|---|---|
| CN | 103155423 A | 6/2013 |
| EP | 1 041 723 A2 | 10/2000 |

* cited by examiner

APPARATUS AND METHOD FOR PROVIDING COMMUNICATION

CROSS-REFERENCE TO RELATED APPLICATION(S)

This application claims the benefit under 35 U.S.C. § 119(a) of a Korean patent application filed on Jan. 29, 2014 in the Korean Intellectual Property Office and assigned Serial number 10-2014-0011807, the entire disclosure of which is hereby incorporated by reference.

TECHNICAL FIELD

The present disclosure relates to an apparatus and method for providing communication.

BACKGROUND

It is known that, if an impedance of an antenna of an electronic device is well matched, a loss that a current (e.g., a signal) transmitted from a transmission/reception circuit without being radiated through the antenna and may have a value less than or equal to a predetermined range. On the other hand, if an object having a permittivity, such as a hand or a head, is in proximity to the antenna, a change in the permittivity may occur in the vicinity of the antenna, causing a shift (or transition) of a resonant frequency of the antenna. If the impedance of the antenna is mismatched, the loss that a current transmitted from the transmission circuit is returned without being radiated through the antenna may have a value greater than or equal to a predetermined range. The electronic device may control its impedance matching circuit based on the signal that is returned without being radiated.

In case of a tunable antenna-based electronic device, when transmitting a signal for data transmission, the electronic device may obtain a return loss for the transmitted signal to control an impedance of the impedance matching circuit. However, the electronic device cannot control its tunable antenna during the time period (e.g., the idle mode or idle state) in which the electronic device does not perform data communication with an external device such as a base station.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and electronic device for controlling a communication module that is functionally connected to the electronic device, during the time period in which the electronic device does not perform data communication with an external device.

Another aspect of the present disclosure is to provide a method and electronic device for determining whether to control a communication module, based on information related to its communication with an external device.

In accordance with an aspect of the present disclosure, a method for providing communication in an electronic device is provided. The method includes determining whether to control a communication module of the electronic device based on at least a part of information related to communication between the electronic device and an external device, determining a control value for the communication module based on the determination, and controlling the communication module using at least a part of the control value.

In accordance with another aspect of the present disclosure, an electronic device for providing communication is provided. The electronic device includes a communication module, and a communication control module configured to determine whether to control the communication module based on at least a part of information related to communication between the electronic device and an external device, to determine a control value for the communication module based on the determination, and to control the communication module using at least a part of the control value.

In accordance with another aspect of the present disclosure, an electronic device for providing communication is provided. The electronic device includes a transmission/reception unit configured to transmit a signal during an idle state, and a communication control module configured to estimate a change in a resonant frequency of an antenna using a return loss generated by a transmission of the signal, and to control an impedance of the antenna based on the change in the resonant frequency of the antenna.

The present disclosure may have a variety of embodiments in addition to the above embodiments without departing from the scope of the present disclosure.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
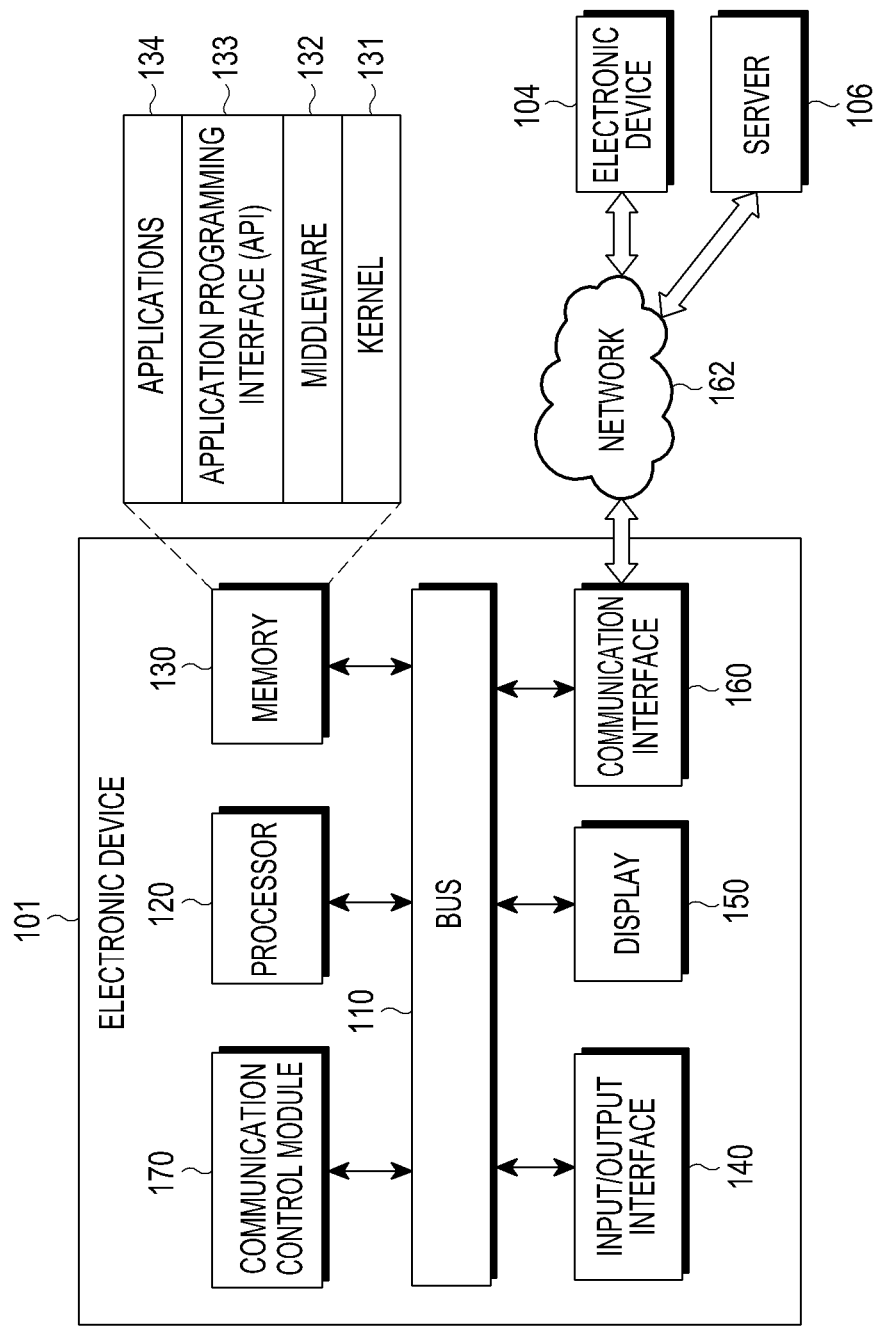
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to various embodiments of the present disclosure may be equipped with a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a digital camera, or a wearable device (e.g., a Head Mounted Device (HMD) (such as electronic glasses), electronic apparel, electronic bracelet, electronic necklace, electronic accessory (or appcessory), electronic tattoo, or smart watch).

In some embodiments, the electronic device may be a smart home appliance equipped with a communication function. The smart home appliance may include at least one of, for example, a TeleVision (TV), a Digital Video Disk (DVD) player, an audio player, a refrigerator, an air conditioner, a vacuum cleaner, an oven, a microwave oven, a washer, an air cleaner, a set-top box, a TV box (e.g., Samsung HomeSync™, Apple TV™, or Google TV™), a game consoles, an electronic dictionary, an electronic key, a camcorder, and an electronic photo frame.

In some embodiments, the electronic device may include at least one of various medical devices (e.g., Magnetic Resonance Angiography (MRA), Magnetic Resonance Imaging (MRI), Computed Tomography (CT), a medical camcorder, a medical ultrasonic device, etc.), a navigation device, a Global Positioning System (GPS) receiver, an Event Data Recorder (EDR), a Flight Data Recorder (FDR), an automotive infotainment device, a marine electronic device (e.g., a marine navigation device, a gyro compass, etc.), an avionics device, a security device, a car head unit, an industrial or household robot, an Automatic Teller's Machine (ATM) for banks, and Point of Sales (POS) for shops.

In some embodiments, the electronic device may include at least one of a part of the furniture or building/structure equipped with a communication function, an electronic board, an electronic signature receiving device, a projector, and various meter devices (e.g., water, electricity, gas or radio wave meters). The electronic device according to various embodiments of the present disclosure may be any one of the above-described various devices or a combination thereof. The electronic device according to various embodiments of the present disclosure may be a flexible device. The electronic device according to various embodiments of the present disclosure is not limited to the above-described devices.

Reference will now be made to the accompanying drawings to describe information about the electronic device according to various embodiments of the present disclosure. The term 'user' as used herein may refer to a person who uses the electronic device, or a device (e.g., an intelligent electronic device) that uses the electronic device.

FIG. 1 illustrates a network environment including an electronic device according to various embodiments of the present disclosure.

Referring to FIG. 1, an electronic device 101 may include a bus 110, a processor 120, a memory 130, an Input/Output (I/O) interface 140, a display 150, a communication module 160, and a communication control module 170.

The bus 110 may be a circuit that connects the above-described components and transmits communication signals (e.g., control messages) between the above-described components.

The processor 120 may, for example, receive a command from the above-described components (e.g., the memory 130, the I/O interface 140, the display 150, the communication module 160, the communication control module 170 or the like) through the bus 110, decode the received command, and execute the operation or data processing in response to the decrypted command.

The memory 130 may store the command or data that is received from or generated by the processor 120 or other components (e.g., the I/O interface 140, the display 150, the communication module 160, the communication control module 170 or the like). The memory 130 may include programming modules such as, for example, a kernel 131, a middleware 132, an Application Programming Interface (API) 133, or at least one application 134. Each of the above-described programming modules may be configured by any one of software, firmware and hardware, or a combination thereof.

The kernel 131 may control or manage the system resources (e.g., the bus 110, the processor 120, the memory 130 or the like) which are used to execute the operation or function that is implemented by the other programming modules, for example, the middleware 132, the API 133 or the application 134. The kernel 131 may provide an interface via which the middleware 132, the API 133 or the application 134 can access individual components of the electronic device 101, and control or manage them.

The middleware 132 may perform an intermediary role so that the API 133 or the application 134 may communicate with the kernel 131 to exchange data. In response to work requests received from the application 134, the middleware 132 may perform a control operation (e.g., scheduling or load balancing) using a method such as, for example, assigning a priority of using the system resources (e.g., the bus 110, the processor 120, the memory 130 or the like) of the electronic device 101, to at least one of the applications 134.

The API 133, which is an interface via which the application 134 controls the function provided by the kernel 131 or the middleware 132, may include at least one interface or function (e.g., command) for, for example, file control, window control, image processing or text control.

In various embodiments, the application 134 may include a Short Message Service (SMS)/Multimedia Messaging Service (MMS) application, an E-mail application, a calendar application, an alarm application, a healthcare application (e.g., an application for measuring the amount of exercise or the blood sugar) or an environmental information application (e.g., an application for providing the pressure, humidity or temperature information). Additionally or alternatively, the application 134 may be an application related to information exchange between the electronic device 101 and an external electronic device (e.g., an electronic device 104). The application related to information exchange may include, for example, a notification relay application for relaying specific information to the external electronic device, or a device management application for managing the external electronic device.

For example, the notification relay application may include a function of relaying the notification information generated in other applications (e.g., the SMS/MMS application, the E-mail application, the healthcare application, the environmental information application or the like) to the external electronic device (e.g., the electronic device 104). Additionally or alternatively, the notification relay application may, for example, receive notification information from the external electronic device (e.g., the electronic device 104) and provide it to the user. The device management application may, for example, manage (e.g., install, delete or update) the function (e.g., a function of turning on/off the external electronic device itself (or some components thereof) or controlling the brightness (or resolution) of the display) for at least a part of the external electronic device (e.g., the electronic device 104) communicating with the electronic device 101, the application operating in the external electronic device, or the service (e.g., a call service or a message service) provided in the external electronic device.

In various embodiments, the application 134 is specified according to the property (e.g., the type of an electronic device) of the external electronic device (e.g., the electronic device 104). For example, if the external electronic device is an MP3 player, the application 134 may include an application related to music playback. Similarly, if the external electronic device is a mobile medical device, the application 134 may include an application related to healthcare. In one embodiment, the application 134 may include at least one of an application specified in the electronic device 101 and an application received from the external electronic device (e.g., a server 106 or the electronic device 104).

The I/O interface 140 may provide the command or data that is entered by the user through an I/O device (e.g., a sensor, a keyboard or a touch screen), to the processor 120, the memory 130, the communication module 160 or the communication control module 170 through, for example, the bus 110. For example, the I/O interface 140 may provide the data about a user's touch made on a touch screen, to the processor 120. The I/O interface 140 may, for example, output the command or data that is received from the processor 120, the memory 130, the communication module 160 or the communication control module 170 via the bus 110, through an I/O device (e.g., a speaker or a display). For example, the I/O interface 140 may output the voice data processed by the processor 120 to the user through the speaker.

In one embodiment, the I/O interface 140 may include a sensor module. The sensor module may include at least one of, for example, a gesture sensor, a gyro sensor, a barometric sensor, a magnetic sensor, an acceleration sensor, a grip sensor, a proximity sensor, a color sensor (e.g., a Red/Green/Blue (RGB) sensor), a bio sensor (e.g., a heart rate monitor or a protein meter), a temperature/humidity sensor, an illuminance sensor, and a Ultra Violet (UV) sensor. Additionally or alternatively, the sensor module may include, for example, an E-nose sensor, an ElectroMyoGraphy (EMG) sensor, an ElectroEncephaloGram (EEG) sensor, an ElectroCardioGram (ECG) sensor, an InfraRed (IR) sensor, an iris sensor or a fingerprint sensor. The sensor module may further include a control circuit for controlling one or more sensors.

The display 150 may display a variety of information (e.g., multimedia data, text data or the like) for the user.

The communication module 160 may enable communication between the electronic device 101 and an external device (e.g., the electronic device 104 or the server 106). For example, the communication module 160 may be connected to a network 162 by wireless communication or wired communication to communicate with the external device. The wireless communication may include at least one of, for example, Wireless Fidelity (WiFi), BlueTooth (BT), Near Field Communication (NFC), Global Positioning System (GPS) or cellular communication (e.g., Long Term Evolution (LTE), Long Term Evolution-Advanced (LTE-A), Code Division Multiple Access (CDMA), Wideband Code Division Multiple Access (WCDMA), Universal Mobile Telecommunication System (UMTS), Wireless Broadband (WiBro), Global System for Mobile communication (GSM) or the like). The wired communication may include at least one of, for example, Universal Serial Bus (USB), High Definition Multimedia Interface (HDMI), Recommended Standard 232 (RS-232) and Plain Old Telephone Service (POTS).

In one embodiment, the communication module 160 may perform data transmission/reception in communication between the electronic device 101 and other electronic devices (e.g., the electronic device 104 or the server 106) that are connected to the electronic device 101 over the network 162. In one embodiment, the communication module 160 may include at least one of a cellular module, a WiFi module, a BT module, a GPS module, an NFC module, and a Radio Frequency (RF) module.

The cellular module may provide a voce call, a video call, a text message service, an Internet service or the like over the communication network (e.g., LTE, LTE-A, CDMA, WCDMA, UMTS, WiBro, GSM or the like). The cellular module may perform identification and authentication on an electronic device in the communication network by using, for example, a subscriber identity module (e.g., a Subscriber Identity Module (SIM) card). In one embodiment, the cellular module may include a Communication Processor (CP). The cellular module may be implemented as, for example, a System of Chip (SoC).

Each of the WiFi module, the BT module, the GPS module and the NFC module may include, for example, a processor for processing the data that is transmitted and received through the module. Although the cellular module, the WiFi module, the BT module, the GPS module and the NFC module have been described as individual blocks, some (e.g., two or more) of the cellular module, the WiFi module, the BT module, the GPS module and the NFC module may be incorporated into one Integrated Chip (IC) or IC package, in one embodiment. For example, some of the processors corresponding to the cellular module, the WiFi module, the BT module, the GPS module and the NFC module may be implemented as one SoC.

The RF module may transmit and receive data (e.g., RF signals). The RF module may include, for example, a transceiver, a Power Amp Module (PAM), a frequency filter, a Low Noise Amplifier (LNA) or the like. The RF module may further include parts (e.g., a conductor, a conducting wire or the like) for transmitting and receiving radio waves in the free space in wireless communication. The cellular module, the WiFi module, the BT module, the GPS module and the NFC module may share the RF module with each another. In one embodiment, at least one of the cellular module, the WiFi module, the BT module, the GPS module and the NFC module may transmit and receive RF signals through its individual RF module.

In one embodiment, the communication module 160 may include a physical characteristic control module. The physical characteristic control module may control the physical characteristics of at least a part (e.g., the RF module) of the communication module 160. For example, the physical characteristic control module may include a variable element (e.g., a variable capacitor) for controlling an impedance of the RF module. For example, the physical characteristic control module may control the frequency characteristics of the RF module by controlling the variable element unit.

In one embodiment, the network 162 may be a communication network. The communication network may include at least one of a computer network, the Internet, Internet of Things (IoT), and a telephone network. In one embodiment, a protocol (e.g., a transport layer protocol, a data link layer protocol or a physical layer protocol) for communication between the electronic device 101 and an external device may be supported in at least one of the application 134, the API 133, the middleware 132, the kernel 131 and the communication module 160.

The communication control module 170 may determine whether to control the communication module 160 based on at least a part of information related to communication between the electronic device 101 and an external device (e.g., a base station), determine a control value for the communication module 160 based on the determination, and control the communication module 160 using at least a part of the control value. In one embodiment, the communication control module 170 may include at least one processor, a Read Only Memory (ROM) in which a control program is stored, or a Random Access Memory (RAM) that temporarily stores signals or data, or that is used as a work space for an operation performed in the electronic device 101.

In one embodiment, the communication control module 170 may determine whether to control the communication module 160 based on at least one of the state of the electronic device 101, the communication quality between the electronic device 101 and the external device, the information about the communication schedule with another external device, and the information indicating whether the electronic device 101 is required to be handed over to the heterogeneous network.

In one embodiment, the communication control module 170 may determine to control the communication module 160, if there is no data transmission between the electronic device 101 and the external device (i.e., if the electronic device 101 is in the idle mode or idle state). For example, the idle mode or idle state may include the state in which there is no data transmission and reception to/from a base station. The idle mode or idle state may include states other than states such as a Public Land Mobile Network (PLMN) search state, a network selection or re-selection state, a location registration-to-base station state, and a Closed Subscriber Group (CSG) selection state. For example, the communication control module 170 may determine to control the communication module 160 periodically (e.g., at intervals of about 10 minutes) in the idle state. Alternatively, the communication control module 170 may determine to control the communication module 160 aperiodically (e.g., at random time intervals) in the idle state.

In one embodiment, the communication control module 170 may determine to control the communication module 160 if the communication quality between the electronic device 101 and an external device corresponds to (or falls within) a specified range. For example, based on at least one of Received Signal Code Power (RSCP), Reference Signal Received Power (RSRP), Received Signal Strength Indication (RSSI) and Quality of Service (QoS), the communication control module 170 may determine to control the communication module 160 if the communication quality corresponds to a specified range or if the communication quality is less than or equal to a specified threshold. In another embodiment, the communication control module 170 may obtain information (e.g., a threshold for an Inter-Radio Access Technology (I-RAT) handover) related to a handover to the heterogeneous network based on the information included in a System Information Block (SIB) received from the base station and determine whether to control the communication module 160 based on the obtained information.

In one embodiment, the communication control module 170 may detect a contact and/or proximity of an object, which has a permittivity, to the electronic device 101, to determine whether to control the communication module 160. For example, using at least one sensor (e.g., a touch sensor or a grip sensor), the electronic device 101 may obtain an input that is made when a user's body or a conductor is in contact with or in proximity to the electronic device 101. Based on the input, the electronic device 101 may determine whether the user's body or the conductor is in contact with or proximate to the electronic device 101. For example, an electronic device, which is a wearable-type device, may determine whether its user has worn (or put on) the electronic device, using at least one sensor. In one embodiment, the at least one sensor may include a sensor that is mounted on the electronic device to obtain or detect an input to an area corresponding to the side or rear of the electronic device. Based on the determination, the communication control module 170 may determine whether to control the communication module 160.

In one embodiment, the electronic device 101 may obtain information about how the user grips the electronic device 101, using at least one sensor (e.g., a gyro sensor, a grip sensor or a touch sensor) by which the electronic device 101 can obtain grip information about the user's grip. The physical characteristics of the communication module 160 of the electronic device 101 may vary depending on the grip type. Based on the grip information, the communication control module 170 may determine whether to control the communication module 160. For example, if the grip information corresponds to a first grip type (e.g., a type in which the user is talking on the phone, or the user has put the phone in his/her pocket), the communication control module 170 may determine to perform first control. If the grip information corresponds to a second grip type (e.g., a type in which the user is enjoying a game or writing a message on the phone), the communication control module 170 may determine to perform second control. Although each of the conditions based on which the communication control module 170 determines whether to control the communication module 160 has been described through various embodiments, the conditions according to various embodiments may be determined as separate conditions or a combination thereof.

In one embodiment, the communication control module 170 may control the communication module 160 with each of a first control value and a second control value, and based on at least one signal that is received from an external device after the communication module 160 is controlled with each of the control values, the communication control module 170 may determine a control value for the communication module 160 using at least one of the first control value and the second control value. For example, by controlling an impedance value of the communication module 160, the communication control module 170 may receive the signal received from an external device, and compare the received values to determine the control value (e.g., an impedance control value) for the received signal having the highest intensity.

In one embodiment, the communication control module 170 may transmit at least one signal through the communication module 160, and determine the control value based on the transmission. For example, the communication control module 170 may determine the control value by measuring the at least one signal that is returned (i.e., reflected) and lost without being radiated through an RF module. In one embodiment, the communication control module 170 may determine a degree of a shift of a resonant frequency for the communication module 160, referring to a specified table (e.g., Table 1) for the amount of the signal that is returned and lost. The communication control module 170 may determine a control value, referring to the specified table. The specified table may be specified by measuring the amount of the signal that is returned and lost.

TABLE 1

| Return loss | Variable capacitor value |
|---|---|
| 10 dB | 100 pF |
| 5 dB | 10 pF |
| 1 dB | 1 pF |

In one embodiment, referring to Table 1, if the return loss is 10 dB, the communication control module 170 may determine a control value of the variable capacitor as 100 pF. If the return loss is 5 dB, the communication control module 170 may determine a control value of the variable capacitor as 10 pF. If the return loss is 1 dB, the communication control module 170 may determine a control value of the variable capacitor as 1 pF.

In one embodiment, the communication control module 170 may transmit the at least one signal so that the at least one signal that is transmitted in the idle state may not interfere (may not act as interference) with communication of an external device (e.g., a base station or another electronic device 104). For example, the communication control module 170 may control the communication module 160 to transmit the at least one signal at a strength that is less than or equal to a specified value. The specified value may be variably controlled within a variety of ranges depending on the structure of the electronic device 101. For example, the communication control module 170 may control the communication module 160 so that at least one signal that is radiated through the communication module 160 may have a strength of about −90 dBm or below. For example, the communication control module 170 may control the communication module 160 so that the signal that is radiated through the communication module 160 may have the strength less than or equal to a specified strength.

In one embodiment, the communication control module 170 may transmit the at least one signal over a channel that is specified in relation to the communication with at least one external device. For example, the specified channel may include at least one of a common channel such as a Random Access Channel (RACH), an uplink channel such as a Physical Uplink Control Channel (PUCCH), a channel for a Sounding Reference Signal (SRS), and a channel for Discontinuous Reception (DRX). The communication control module 170 may transmit at least one signal over wireless resources (e.g., time or frequency channels) that are allocated to the electronic device 101. The allocated wireless resources may include wireless resources specified by the base station.

In one embodiment, the communication control module 170 may perform at least one of specified modulation and specified encoding on the at least one signal. For example, the communication control module 170 may transmit the at least one signal using the modulation that the external device does not support or cannot demodulate. The communication control module 170 may encode and transmit the at least one signal so that the external device may not decode the encoded signal. The reason is as follows. Even though at least one signal is received or detected at the external device, the communication control module 170 may prevent the external device from performing an unnecessary processing process due to the at least one signal, or prevent interfering with communication of the external device. In one embodiment, the communication control module 170 may transmit the at least one signal through another sequence other than a sequence specified in RACH. The conditions for transmitting at least one signal have been described through various embodiments. The conditions according to various embodiments may be applied as separate conditions or a combination thereof.

In one embodiment, the communication control module 170 may control the physical characteristics of the communication module 160. For example, the communication control module 170 may control at least one of the frequency characteristics of the communication module 160 and the direction of the signal of the communication module 160. For example, the communication control module 170 may control the frequency characteristics of the communication module 160, using a physical characteristic control module (e.g., an impedance matching circuit) in the communication module 160. The communication control module 170 may control the direction of the signal that is radiated through the communication module 160, using an RF module (e.g., a direction antenna) in the communication module 160.

Although the communication module 160 and the communication control module 170 have been described as separate components with reference to FIG. 1, the communication module 160 and the communication control module 170 may be implemented as one component.

Figure 2:
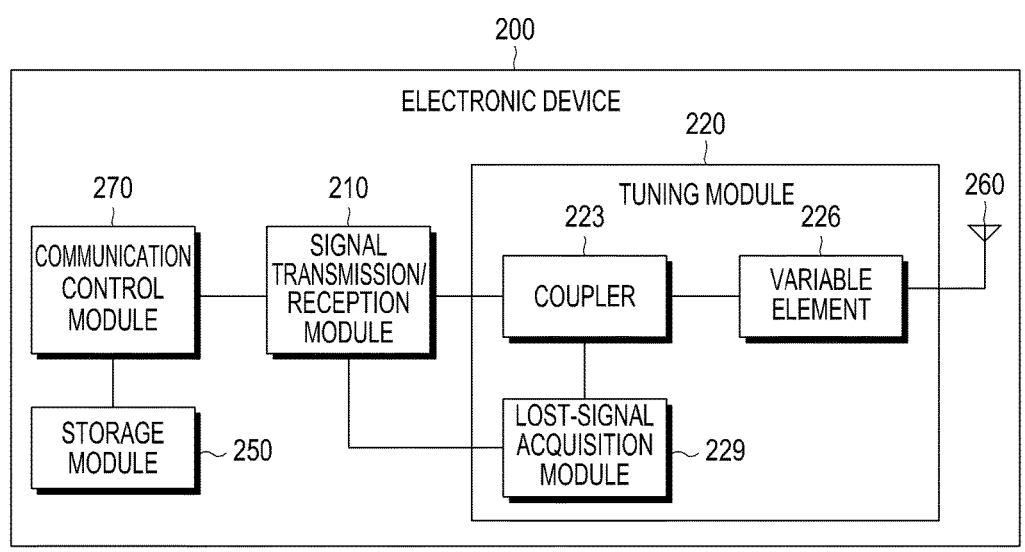
FIG. 2 illustrates an electronic device according to various embodiments of the present disclosure.

FIG. 2 illustrates an electronic device according to various embodiments of the present disclosure.

Referring to FIG. 2, an electronic device 200 may include a signal transmission/reception module 210, a tuning module 220, a storage module 250, an antenna 260, and a communication control module 270.

The signal transmission/reception module 210 may include at least one signal generator for generating an RF signal. The signal transmission/reception module 210 may further include at least one modulator/demodulator (modem). The communication control module 270 may transmit at least one signal (e.g., a test signal) through the signal transmission/reception module 210. In one embodiment, the signal transmission/reception module 210 may include a signal generator for generating a test signal. In one embodiment, the signal transmission/reception module 210 may transmit at least one signal using a signal generator that can generate a signal in a specified range, among at least one signal generator. In one embodiment, if the signal transmission/reception module 210 includes a plurality of signal generators, the signal transmission/reception module 210 may include a switch module for selecting one of the plurality of signal generators. In one embodiment, the signal transmission/reception module 210 may include a device such as the RF module in the communication module 160.

In one embodiment, the tuning module 220 may include a coupler 223, a variable element 226 and a lost-signal acquisition module 229. The coupler 223 may couple at least one signal (e.g., a test signal) that that is generated by the signal transmission/reception module 210 and a signal returned (i.e., reflected) without being radiated through the antenna 260, and provide the coupled signal to the lost-signal acquisition module 229. The lost-signal acquisition module 229 may obtain information about the returned signal based on the characteristics (e.g., the frequency, strength or phrase) of the returned signal. In one embodiment, the communication control module 270 may include the lost-signal acquisition module 229 therein. The variable element 226 may control an impedance of the tuning module 220, and may include at least one of a variable resistor, a variable inductor and a variable capacitor.

The storage module 250 may store the input/output signal or data corresponding to an operation of the signal transmission/reception module 210. The storage module 250 may store applications and a control application for control of the electronic device 200 or the communication control module 270, and may store a table for estimating a frequency that is shifted contact and/or proximity of an object to the electronic device 200. The storage module 250 may store a control value (e.g., an impedance control value) for the at least one variable element 226 for controlling the resonant frequency that is shifted in response to a degree of the permittivity of the object, a property of the object, a location in which the electronic device is placed, a state of the electronic device, and a type in which the user grips the electronic device. The table may be specified in advance or may be updated in response to the measurement of the return loss that is generated by the transmission of a signal.

In one embodiment, the storage module 250 may include a memory. The memory may include an internal memory or an external memory. The internal memory may include at least one of, for example, a volatile memory (e.g., Dynamic RAM (DRAM), Static RAM (SRAM), Synchronous Dynamic RAM (SDRAM), etc.) and a non-volatile memory (e.g., One Time Programmable ROM (OTPROM), Programmable ROM (PROM), Erasable And Programmable ROM (EPROM), Electrically Erasable And Programmable ROM (EEPROM), mask ROM, flash ROM, NAND flash memory, NOR flash memory, etc.).

In one embodiment, the internal memory may be a Solid State Drive (SSD). The external memory may further include a flash drive (e.g., Compact Flash (CF), Secure Digital (SD), Micro Secure Digital (Micro-SD), Mini Secure Digital (Mini-SD), extreme Digital (xD), a memory stick or the like). The external memory may be functionally connected to the electronic device through a variety of interfaces. In one embodiment, the electronic device may further include a storage device (or a storage medium) such as a hard drive.

The antenna 260 may include parts (e.g., a conductor, a conducting wire, a switch, or the like) for transmitting and receiving radio waves in the free space in wireless communication. The antenna 260 may include a plurality of antennas supporting a plurality of frequencies. The antenna 260 may also include a directional antenna that is set to radiate radio waves strongly (or at a high strength) in a specified direction, or to increase the sensitivity for the radio waves in that direction.

The communication control module 270 may include at least one processor. The communication control module 270 may include a device such as the communication control module 170. The communication control module 270 may determine whether to control the communication module (e.g., the variable element 226 or the antenna 260) based on at least a part of information related to the communication between the electronic device 200 and the external device (e.g., a base station), determine a control value (e.g., an impedance or a direction of an antenna) for the communication module based on the determination, and control the communication module using at least a part of the control value.

Although the components of the electronic device 200 have been described as separate components with reference to FIG. 2, the components may be incorporated into one IC or IC package.

Figure 3:
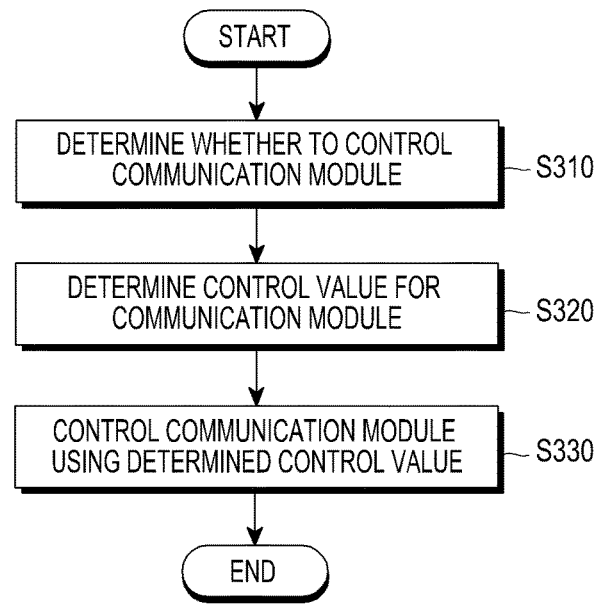
FIG. 3 is a flowchart illustrating a method for providing communication in an electronic device according to an embodiment of the present disclosure.

FIG. 3 is a flowchart illustrating a method for providing communication in an electronic device according to an embodiment of the present disclosure.

Referring to FIG. 3, a method is illustrated for providing communication in an electronic device (e.g., the electronic device 101) according to an embodiment of the present disclosure.

In operation S310, the electronic device (e.g., the communication control module 170 of the electronic device 101) may determine whether to control its communication module (e.g., the communication module 160). The electronic device may determine whether to control the communication module based on at least a part of information related communication with between the electronic device and an external device. For example, the electronic device may determine whether to control the physical characteristics (e.g., the frequency or impedance) of the communication module. In one embodiment, the electronic device may determine to control the communication module, if there is no data transmission between the electronic device and the external electronic device (e.g., if the electronic device is in the idle mode). In addition, the electronic device may determine to control the communication module, if the communication quality between the electronic device and the external device corresponds to (or falls within) a specified range.

In operation S320, the electronic device may determine a control value for the communication module. For example, the electronic device may determine a control value for the communication module based on at least a part of the previous determination. In one embodiment, the electronic device may transmit at least one signal through the communication module, and determine the control value based on the transmission. For example, the electronic device may determine the control value based on a reflected signal that is caused by the transmission. In another embodiment, the electronic device may control the communication module with each of a first control value and a second control value, and determine a control value for the communication module using at least one of the first control value and the second control value, based on at least one signal that is received from the external device after the communication module is controlled with each of the control values.

In operation S330, the electronic device may control the communication module using the control value that was determined in operation S320. The electronic device may control the physical characteristics (e.g., the frequency or impedance) of the communication module using the determined control value.

Figure 4:
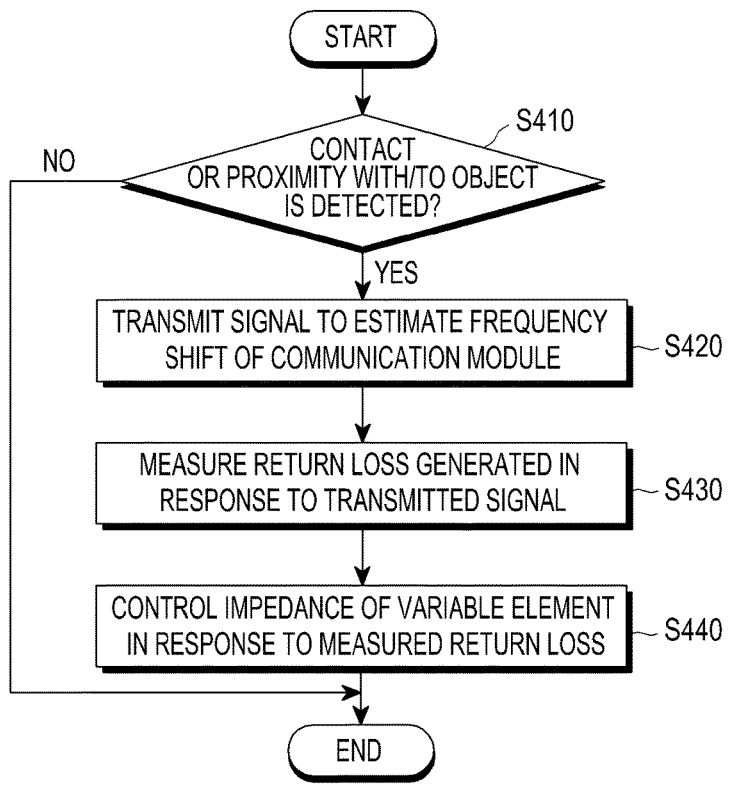
FIG. 4 is a flowchart illustrating a process of providing communication according to an embodiment of the present disclosure.

FIG. 4 is a flowchart illustrating a process of providing communication according to an embodiment of the present disclosure.

Referring to FIG. 4, a process of providing communication according to an embodiment of the present disclosure is illustrated.

In operation S410, in accordance with one embodiment, the electronic device (e.g., the electronic device 101) may detect at least one of a contact and proximity of an object to the electronic device. For example, using a sensor (e.g., the sensor module) that is functionally connected to the electronic device, the electronic device may obtain an input that is made when a user's body or a conductor is in contact with or in proximity to the electronic device.

In operation S420, upon detecting the contact or proximity of the object, the electronic device (e.g., the communication control module 170 of the electronic device 101) may transmit a signal for estimating physical characteristics (e.g., a shift of a resonant frequency) of the communication module (e.g., the communication module 160). In one embodiment, upon detecting a contact or proximity of a user's finger, the electronic device may transmit at least one signal to control the characteristics of the communication module. In operation S430, the electronic device may measure a return loss of a reflected signal that occurs based on the transmitted signal. In operation S440, the electronic device may control an impedance of the variable element in response to the measured return loss.

Figure 5:
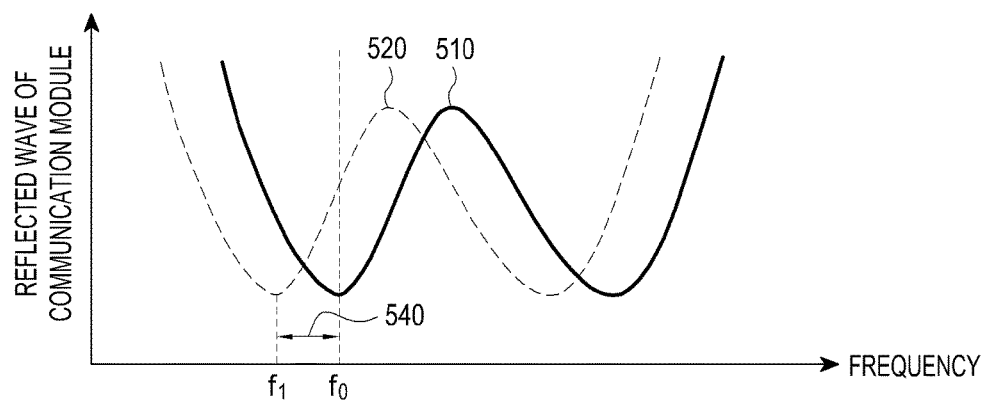
FIG. 5 illustrates a shift of a resonant frequency of a communication module according to an embodiment of the present disclosure.

FIG. 5 illustrates a shift of a resonant frequency of a communication module according to an embodiment of the present disclosure.

Referring to FIG. 5, if an object having a permittivity is in contact with or in proximity to the electronic device, the frequency characteristics of the communication module may be changed. For example, a curve 510 shows a resonant frequency in a state where the object is not in contact with or not in proximity to the electronic device. A curve 520 shows the characteristics of a resonant frequency, which are changed as the object is in contact with or in proximity to the electronic device. The storage module (e.g., the storage module 250) according to various embodiments of the present disclosure may store information related to the resonant frequency that is shifted in response to at least one of information about the permittivity, a property of the object, a location in which the electronic device is placed, and a state of the electronic device. For example, if the user's finger is in contact with the communication module of the electronic device, the resonant frequency 510 corresponding to the communication module may be changed to the resonant frequency 520, which may be shifted as much as an interval 540 corresponding to the permittivity of the finger.

Figure 6:
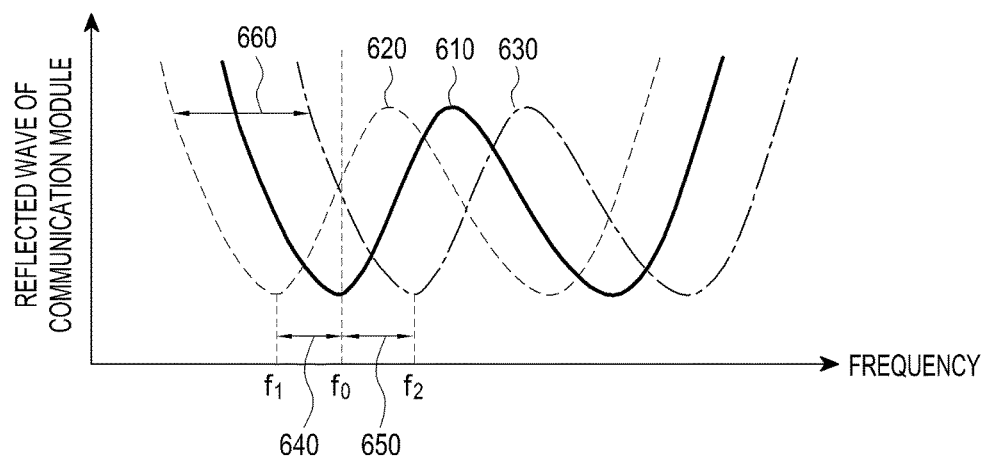
FIG. 6 illustrates a shift of a resonant frequency of a communication module according to another embodiment of the present disclosure.

FIG. 6 illustrates a shift of a resonant frequency of a communication module according to another embodiment of the present disclosure.

Referring to FIG. 6, if an object having a permittivity is in contact with or in proximity to the electronic device, the frequency characteristics of the communication module may be changed. For example, a curve 610 shows a resonant frequency when the object is not in contact with or not in proximity to the electronic device. Further, curves 620 and 630 illustrate the characteristics of a resonant frequency, which change as the object is in contact with or in proximity to the electronic device. The resonant frequency 610 may be shifted up (see 630) or shifted down (see 620). A degree of the shift may vary depending on the degree of the permittivity or the property of the object. If a return loss of only one channel or one frequency band is measured, it may be difficult to measure a direction of the shift of the resonant frequency due to the above characteristics. For example, if the communication control module (e.g., the communication control module 170) measures the return loss at a frequency $f_0$, it is difficult to measure the direction because the return loss at the resonant frequency 630 which is shifted to a frequency higher than the resonant frequency 610 of the communication module is almost the same as the return loss at the resonant frequency which is shifted to the lower frequency 620. In contrast, the communication control module according to an embodiment of the present disclosure may receive a first signal and a second signal by controlling the communication module with a first control value and a second control value, respectively, and based on the received first and second signals, the communication control module may determine the control value based on at least one of the first control value and the second control value.

Figure 7A:
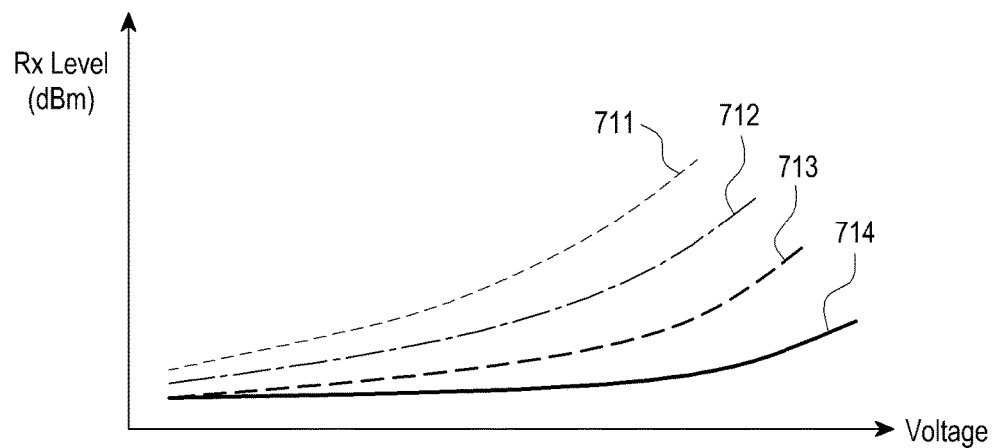
FIGS. 7A and 7B illustrate a correlation between a communication module and an object according to an embodiment of the present disclosure.
Figure 7B:
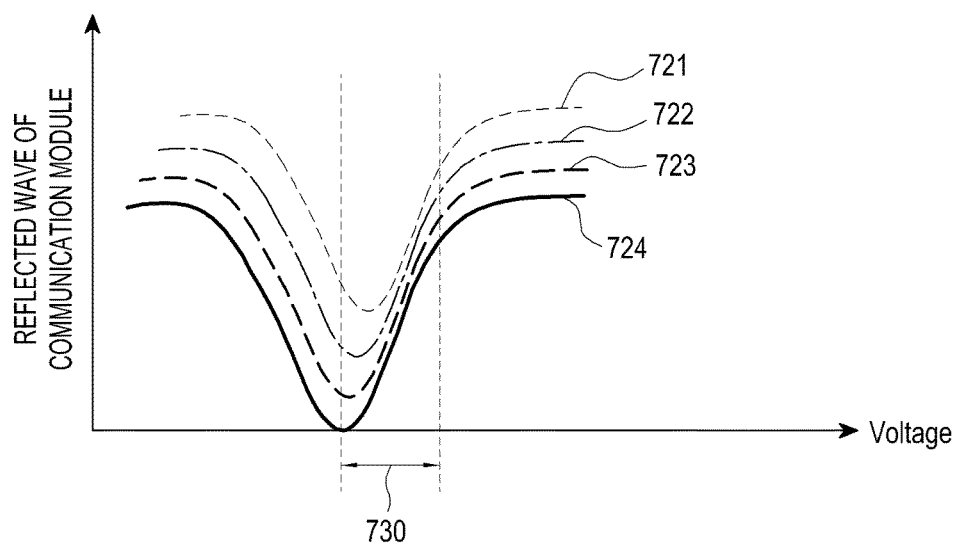

FIGS. 7A and 7B illustrate a correlation between a communication module and an object according to an embodiment of the present disclosure.

Referring to FIG. 7A, a change in the communication quality (e.g., reception quality or RSSI) in response to a change in the control value for each adjacent object (e.g., the control value for a variable element) is illustrated. For example, FIG. 7A is a graph having a curve 711 representing the communication quality in the free space, a curve 712 representing the communication quality when the user's hand is in proximity to the communication module (e.g., when the user is gripping or wearing the electronic device), a curve 713 representing the communication quality when the user's head and hand are in proximity to the communication module at the same time (e.g., when the user is talking on the phone), and a curve 714 representing the communication quality when a metallic object is in proximity to the communication terminal.

Referring to FIG. 7B, an intensity (e.g., a Voltage Standing Wave Ratio (VSWR)) of a reflected wave of a communication module in response to a change in the control value for each adjacent object (e.g., the control value for a variable element) is illustrated. For example, FIG. 7B is a graph having a curve 724 representing the intensity of the reflected wave in the free space, a curve 723 representing the intensity of the reflected wave when the user's hand is in proximity to the communication module (e.g., when the user is gripping or wearing the electronic device), a curve 722 representing the intensity of the reflected wave when the user's head and hand are in proximity to the communication module at the same time (e.g., when the user is talking on the phone), and a curve 721 representing the intensity of the reflected wave when a metallic object is in proximity to the communication terminal. In one embodiment, the electronic device may store, in the storage module (e.g., the storage module 250), information about the communication quality or the intensity of the reflected wave, which may vary depending on the object.

Figure 8:
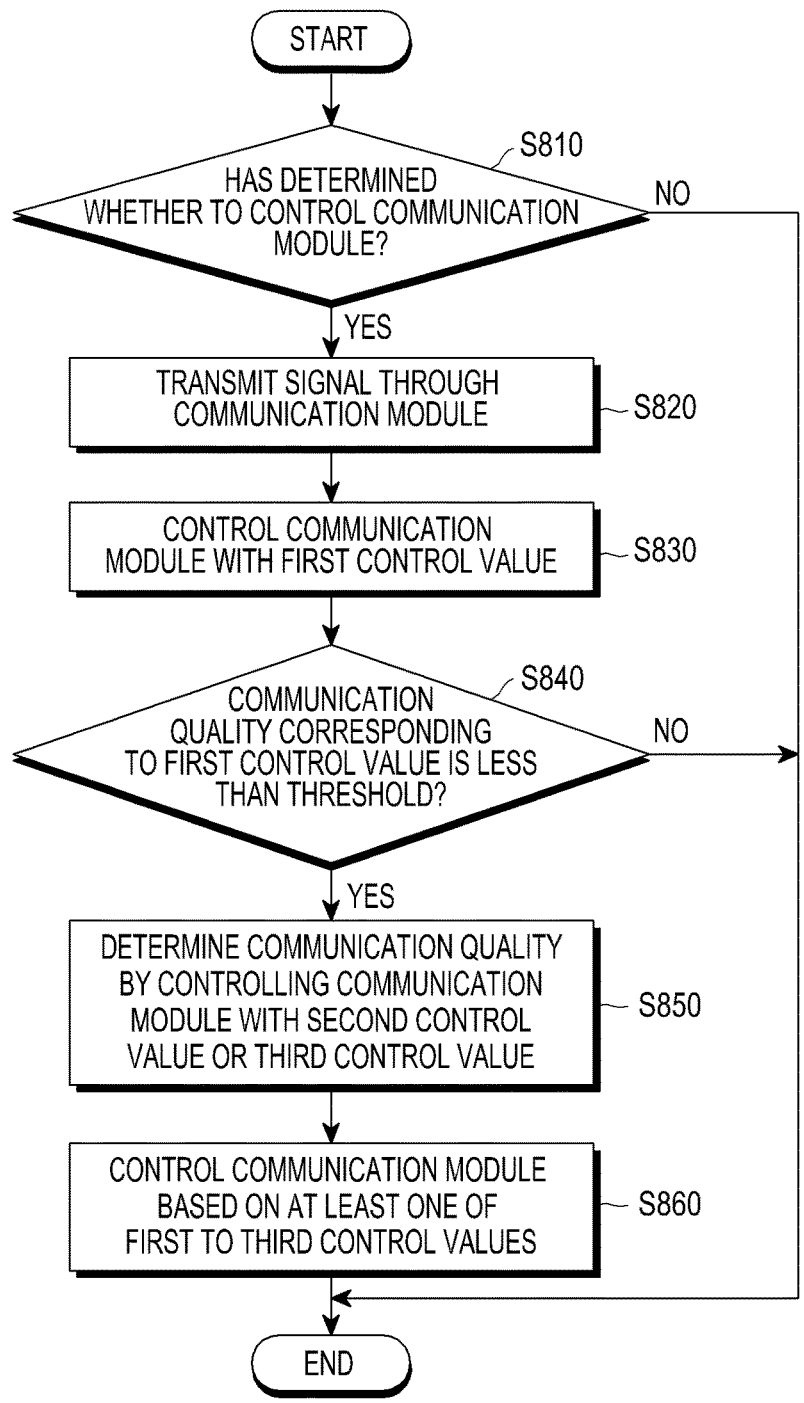
FIG. 8 is a flowchart illustrating a process of providing communication in an electronic device according to an embodiment of the present disclosure.

FIG. 8 is a flowchart illustrating a process of providing communication in an electronic device according to an embodiment of the present disclosure.

Referring to FIG. 8, a process of providing communication in an electronic device according to another embodiment of the present disclosure is illustrated.

In operation S810, the electronic device (e.g., the electronic device 101) may determine whether to control the communication module (e.g., the communication module 160). In operation S820, based on the determination results, the electronic device (e.g., the communication control module 170 of the electronic device 101) may transmit at least one signal through the communication module to determine a control value for the communication module. In operation S830, the electronic device may control the communication module by determining a first control value for the communication module based on the return loss of the signal that is generated and returned in response to the transmitted signal.

In operation S840, the electronic device may determine whether the communication quality for the signal received through the controlled communication module corresponds to (or falls within) a specified range. For example, the electronic device may determine to control the communication module, if the communication quality is less than or equal to a specified reference, based on at least one of RSCP, RSRP, RSSI and QoS.

In operation S850, based on the determination, the electronic device may control the communication module with each of a second control value and a third control value, and determine the communication quality of at least one signal that is received from an external device after the communication module is controlled. In operation S860, based on the determination results, the electronic device may control the communication module based on at least one of the second control value and third control value. In one embodiment, the electronic device may control the communication module based on the first control value to the third control value. For example, the electronic device may determine a control value for controlling the communication module in accordance with Equation 1.

$$\min_i\{|X(i)_{rx\_th} - X_{tx\_opt}|\} \quad \text{Equation 1}$$

In Equation 1, $X_{tx\_opt}$ represents a first control value, $X(i)_{rx\_th}$ represents a second control value to a third control value, and i represents an index for each of the second control value to the third control value, and the index may have a natural number. In one embodiment, $X(i)_{rx\_th}$ may include a control value only for the case where the communication quality of the received signal falls within a specified range.

In another embodiment, additionally or alternatively, the electronic device may obtain information about the communication quality for the signal that is received after the electronic device controlled the communication module with at least one of, for example, the first control value to the third control value. The electronic device may select at least one of the curves 711, 712, 713 and 714 in FIG. 7A, based on the information about the communication quality for the first control value to the third control value. For example, the electronic device may determine that the electronic device is in the free space if the information about the communication quality for the first control value to the third control value corresponds to the curve 711. In this case, the electronic device may determine a fourth control value or a fifth control value, using the information corresponding to the curve 724 in FIG. 7B. For example, the electronic device may determine the fourth control value or the fifth control value based on the interval 730. The electronic device may obtain information about the communication quality of the signal that is received by controlling the communication module based on the fourth control value or the fifth control value. In one embodiment, a difference between the fourth control value and the fifth control value may be less than or equal to a difference between the second control value and the third control value. Thereafter, the electronic device may determine a control value for the communication module in accordance with Equation 1, to control the communication module. For example, the electronic device may control the communication module, while repeatedly performing this operation.

It will be appreciated that various embodiments of the present disclosure can be implemented by software, hardware, or a combination thereof. The software may be stored in a volatile or non-volatile storage device (e.g., an erasable/re-writable ROM), a memory (e.g., a RAM, a memory chip, a memory device, or a memory IC), or an optically/magnetically recordable machine (e.g., computer)-readable storage medium (e.g., a Compact Disk (CD), a Digital Versatile Disk (DVD), a magnetic disk or magnetic tape). It can be noted that a storage unit that can be mounted in an electronic device may be an example of a non-transitory machine-readable storage medium suitable to store a program or programs including instructions for implementing various embodiments of the present disclosure. Therefore, the present disclosure may include a program including a code for implementing the apparatus and method as defined by the appended claims, and a non-transitory machine-readable storage medium storing the program. This program may be electronically carried on any media such as communication signals that are transmitted through wired/wireless connections.

The electronic device may receive and store the program from a program server to which the electronic device is connected via a wired or wireless connection. The program server may include a storage unit configured to store a program including instructions for implanting the method for providing communication by the electronic device, and to store information used for the method for providing communication, a communication unit configured to perform wired/wireless communication with the electronic device, and a controller configured to transmit a program to the electronic device automatically or upon request of the electronic device.

As is apparent from the foregoing description, according to various embodiments of the present disclosure, an electronic device may provide communication with at least one external device, and measure a change in the physical characteristics of the communication module due to an object near the electronic device, to control the characteristics of the communication module.

In addition, according to various embodiments of the present disclosure, an electronic device may reduce the current that the electronic device consumes to control the characteristics of the communication module.

Besides, according to various embodiments of the present disclosure, an electronic device may control the characteristics of the communication module in the idle state, thereby improving the reception rate in the idle state.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for providing communication in an electronic device, the method comprising:
    detecting at least one of contact or proximity with an object;
    determining whether an impedance of an antenna of the electronic device changes based on the detecting of the object;
    when the impedance changes and there is no data to transmit, transmitting at least one signal through the antenna for determining a control value for controlling a resonant frequency of a transceiver of the electronic device;
    measuring a reflected signal that is reflected through the antenna based on the transmitted at least one signal for determining the control value;
    determining the control value for controlling the resonant frequency of the transceiver based on the reflected signal; and
    controlling an impedance of an antenna of the electronic device based on the control value.

2. The method of claim 1, wherein the transmitted at least one signal does not include data for communication between the electronic device and an external device.

3. The method of claim 1, wherein the transmitting of the at least one signal comprises transmitting the at least one signal at a strength that is less than or equal to a specified value.

4. The method of claim 1, wherein the transmitting of the at least one signal comprises transmitting the at least one signal over a channel that is specified in relation to the communication.

5. The method of claim 1, wherein the at least one signal is modulated using a modulation scheme that cannot be demodulated by an external device.

6. The method of claim 1, further comprising:
    receiving a first signal and a second signal by controlling the transceiver with a first control value and a second control value; and
    determining one of the first control value and the second control value as the control value based on the first signal and the second signal.

7. The method of claim 1, wherein the control value is determined if a communication quality between the electronic device and an external device corresponds to a specified range.

8. The method of claim 1, wherein the determining of the control value comprises determining whether to control physical characteristics of the transceiver.

9. The method of claim 8, wherein the controlling of the transceiver comprises controlling frequency characteristics of the transceiver.

10. A non-transitory computer-readable recording medium storing instructions that, when executed, cause at least one processor to perform the method of claim 1.

11. An electronic device for providing communication, the electronic device comprising:
    an antenna;
    a transceiver; and
    a processor configured to:
        detect at least one of contact or proximity with an object,
        determine whether an impedance of an antenna of the electronic device changes based on the detecting of the object,
        when the impedance changes and there is no data to transmit, transmit at least one signal through the antenna for determining a control value for controlling a resonant frequency of the transceiver,
        measure a reflected signal that is reflected based on the transmitted at least one signal for determining the control value,
        determine the control value for controlling the resonant frequency of the transceiver based on the reflected signal, and
        control an impedance of an antenna of the electronic device based on the control value.

12. The electronic device of claim 11, wherein the transceiver comprises a signal generator configured to generate the at least one signal that is not related to the data communication with an external device.

13. The electronic device of claim 11, wherein the processor is further configured to:
    receive a first signal and a second signal by controlling the transceiver with a first control value and a second control value, and
    determine one of the first control value and the second control value as the control value based on the received first signal and second signal.

14. The electronic device of claim 11, wherein the processor is further configured to transmit the control value for controlling the resonant frequency based on at least one of communication status, communication quality, communication schedule with an external device, and handoff.

15. The electronic device of claim 14, wherein the processor is further configured to:
    determine if communication quality between the electronic device and the external device corresponds to a specified range, and
    if the communication quality corresponds to the specified range, control the transceiver to determine the control value.

16. The electronic device of claim 14, wherein the processor is further configured to:
    measure a quality of a signal received from the external device, and
    if the measured quality corresponds to a predefined threshold range, control the resonant frequency of the antenna.

17. The electronic device of claim 16, wherein the processor is further configured to:
    measure the quality of the signal received from the external device by controlling an impedance of a variable element in the transceiver corresponding to the resonance frequency of the antenna, if the measured quality is outside of the predefined threshold range, and
    control the resonant frequency of the antenna using an impedance at which a difference between the measured quality of the signal and a signal quality falling within the predefined threshold range is minimal.

18. The electronic device of claim 11, wherein the processor is further configured to:
    estimate a change in the resonant frequency using a return loss generated by the transmitted at least one signal, and control the impedance of the antenna based on the change in the resonant frequency of the antenna.

19. The electronic device of claim 18, wherein the processor is further configured to:
calculate an amount of the return loss, and
determine the change in the resonant frequency of the antenna based on the return loss applied to a predefined table.

20. The electronic device of claim 18, further comprising:
a storage unit configured to store a table for estimating the change in the resonant frequency,
wherein the table includes an impedance value that is specified in advance according to a location in which the electronic device is placed, a state of the electronic device, and an occasion at which an object is in contact with or in proximity to the electronic device.

* * * * *